Jan. 3, 1928.

E. F. W. ALEXANDERSON 1,655,035

REGULATING SYSTEM

Original Filed Jan. 17, 1925   2 Sheets-Sheet 1

Inventor:
Ernst F. W. Alexanderson,
by *Alexander F. Lunt*
His Attorney.

Jan. 3, 1928.
E. F. W. ALEXANDERSON
1,655,035
REGULATING SYSTEM
Original Filed Jan. 17, 1925   2 Sheets-Sheet 2
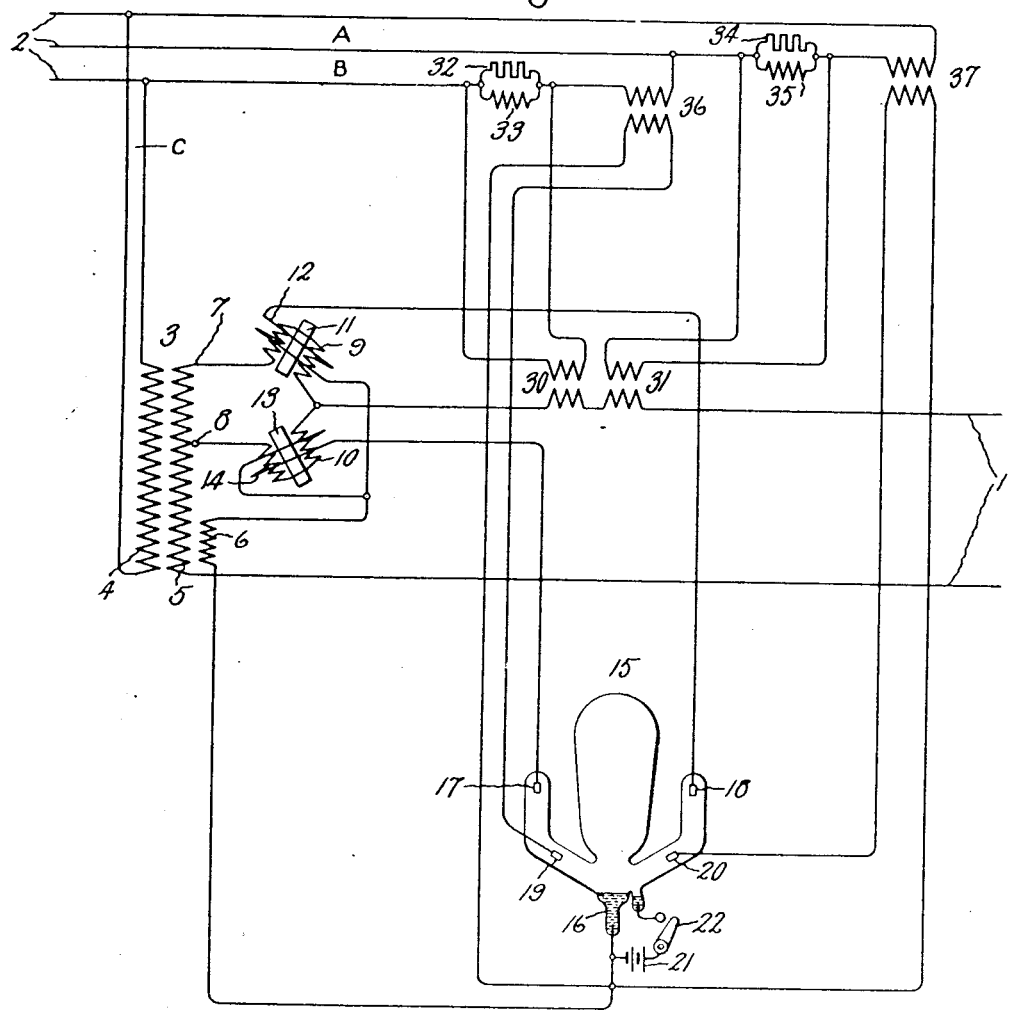
Fig. 3.
Fig. 4.
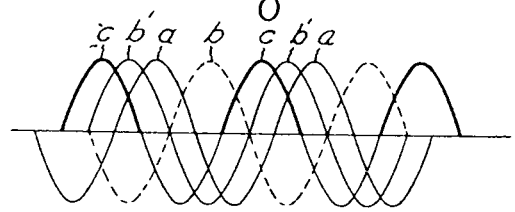
Fig. 5.
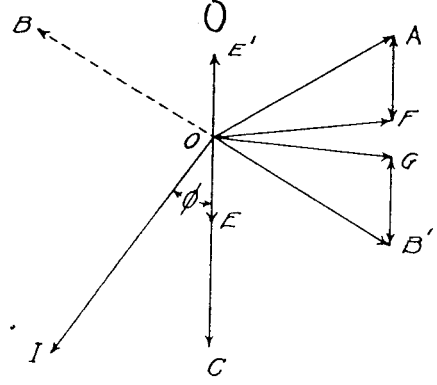
Inventor:
Ernst F. W. Alexanderson,
by *Alexander F. Lunt.*
His Attorney.

Patented Jan. 3, 1928.

1,655,035

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

REGULATING SYSTEM.

Application filed January 17, 1925, Serial No. 3,200. Renewed October 27, 1927.

My invention relates to systems for regulating an electrical condition of an alternating current circuit, and has for its object the provision of an improved regulating system which comprises few or no moving parts and is both quick and sensitive in its operation.

In my Letters Patent of the United States, No. 1,337,875, April 20, 1920, which is assigned to the same assignee as the present application, I have disclosed and claimed an arrangement wherein an alternating current load circuit is connected to different secondary taps of a transformer through reactors which have magnetic cores and are arranged to have the relation between their reactances varied for the purpose of regulating the voltage which is impressed on the circuit by the transformer.

In accordance with the arrangement disclosed in my Letters Patent aforesaid, a plurality of electrodynamic machines, each having its armature winding connected to a suitable source of current in series with the saturation coil of a different reactor, are arranged to have their counter-electromotive forces varied by means of a vibratory device connected in the field circuits of the machines and arranged to be operated in accordance with an electrical condition of the alternating current load circuit. With such arrangement, too high a voltage on the load circuit causes the saturation of the core of the reactor connected to the low voltage tap to increase, thus decreasing the voltage of the load circuit, and too low a voltage on the load circuit results in a greater degree of saturation in the core of the reactor connected to the high voltage tap, thus increasing the voltage of the load circuit.

My present invention is in some respects similar to that disclosed by my aforementioned patent, but differs therefrom mainly in that the function of controlling the current supplied to the saturation coils of the reactors is performed by an electron discharge device either in response to the operation of a vibrating device or altogether without the use of moving mechanical parts.

My invention will be better understood from the following description when considered in connection with the accompanying drawings and its scope will be pointed out in the appended claims.

Figure 1:
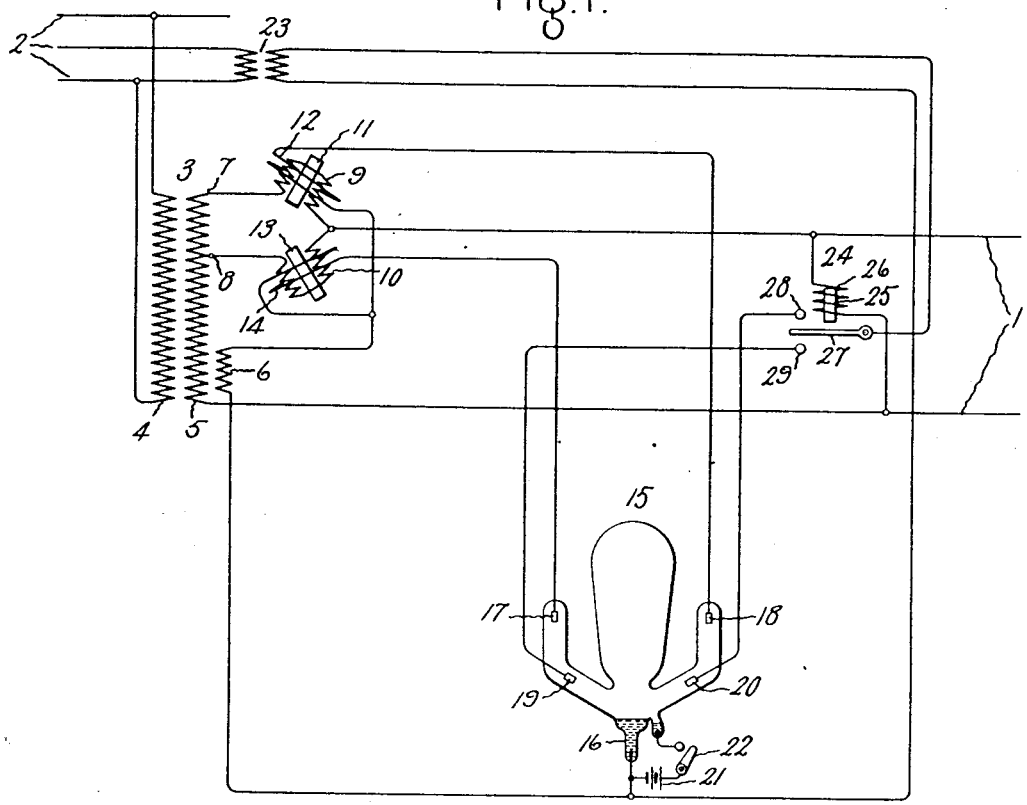
Figure 2:
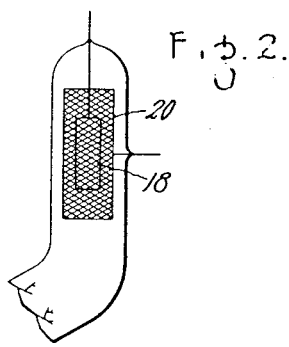

Referring to the drawings, Fig. 1 shows an arrangement in which a mercury rectifier is associated with a vibratory device for controlling the current of the reactor saturation coils; Fig. 2 shows a detail of the mercury rectifier; Fig. 3 shows a modification which does not involve the use of moving mechanical parts; and Figs. 4 and 5 show certain electrical relations which obtain in the operation of the apparatus shown by Fig. 3.

Fig. 1 shows a load circuit 1, which is arranged to be supplied with current from a polyphase power transmission line 2 through transformation or current supply means shown as a transformer 3 comprising a primary winding 4, a secondary winding 5, and a tertiary winding 6. At one side the load circuit 1 is connected directly to the secondary winding 5 and at the other side it is connected to the transformer taps 7 and 8 through reactance coils 9 and 10 respectively. A magnetic core 11 and a saturation coil 12 are associated with the reactance coil 9. A like core 13 and coil 14 are associated with the reactance coil 10. The saturation coils 12 and 14 are arranged to be supplied with current from the tertiary winding 6 through an electronic control device diagrammatically shown as a mercury rectifier 15 which comprises a cathode 16, anodes 17 and 18, and grids 19 and 20. Suitable means shown as a battery 21 and a switch 22 are provided for initiating the operation of the rectifier 15.

A transformer 23 and a vibratory device 24 are provided for controlling the voltage of the grids 19 and 20 in response to variation in the value of the voltage of the load circuit 1. The vibratory device 24 comprises a core 25 and an operating coil 26 arranged to be connected across the line 1 for the purpose of controlling the movement of a vibratory member 27 which is arranged to engage the contacts 28 and 29 under different operating conditions of the line 1. As indicated by Fig. 2, the anode 18 may be surrounded by the grid 20. Other suitable arrangements of the grids with respect to the anodes will readily occur to those skilled in the art.

Assuming that the operation of the device 15 has been initiated by battery 21, an increase in the voltage of the load circuit 1 will cause the member 27 to move into engagement with the contact 28, thus connecting the grid 20 to the upper secondary winding terminal of the transformer 23. Under these conditions, the grid 20 and cathode 16 are negatively charged at periods of time which are the same or partially coincide and the transmission of current from the tertiary winding 6 through the saturation winding 12 is in a large measure, if not altogether, prevented. While the contact 29 is disengaged from the vibratory member 27, however, rectified current is supplied to the saturation coil 14 and the reactance of the coil 10 connected to the tranformer tap 8 is reduced, thus changing the effective ratio of transformation in a manner to reduce the voltage applied to the line 1. In case the voltage of the line 1 becomes too low, the contact member 27 is moved into engagement with the contact 29. When this occurs, the grid 19 and cathode 16 are negatively charged during periods of time which are the same or partially coincide, the transmission of current through the saturation coil 14 is prevented or greatly reduced, current is supplied to the saturation coil 12 and the voltage of the line 1 is raised. Departure of the load circuit voltage from its normal value thus immediately brings into action a force tending to restore it to its normal value. It will be observed that the only moving mechanical part utilized in accomplishing this result is the member 27 of the vibratory device 24 which may be calibrated in any suitable manner to maintain the load circuit voltage at its normal value.

Fig. 3 shows a modification of my invention which does not involve the use of moving mechanical parts. In this modification the phases of the resultant voltages applied to the circuits of grids 19 and 20 are controlled through current transformers 30 and 31 which have their primary windings connected in the alternating load circuit 1 and their secondary windings connected to different phases of the polyphase line 2 through parallel-connected resistor 32 and reactor 33 and parallel-connected resistor 34 and reactor 35 respectively. A grid transformer 36 is connected to one phase of the polyphase line 2 in series with the parallel-connected resistor 32 and reactor 33. A grid transformer 37 is likewise connected to another phase of the polyphase line in series with the parallel-connected resistor 34 and reactor 35.

As hereinafter explained, the connections are such that the reversed voltage of the polyphase line is impressed on the transformer 36 and the resistor 32 and reactor 33. It should also be noted that the secondary circuits of the transformers 30 and 31 are reversed with respect to one another. With these connections, the value and phase of the voltages impressed on the grid circuits will be dependent on the magnitude of the current transmitted through the load circuit 1. This will be readily understood when Figures 4 and 5 are considered in connection with Fig. 3.

In Fig. 4, the polyphase voltages of the line 2 at succeeding instants of time are represented by the curves $a$, $b$ and $c$, and in Fig. 5, these voltages are represented by the vectors A, B and C. In Figs. 4 and 5, the curve $b$ and vector B have also been shown as reversed, the reversed curve and vector being indicated by $b'$ and B' respectively. The curve $b'$ and vector B' have been shown for the reason that, in the arrangement of Fig. 3, the reversed voltage of phase B of the polyphase line 2 is applied to the transformer 36 and the parallel-connected resistor 32 and reactor 33. It will be apparent that the voltage applied to the load circuit 1 through the secondary winding 7 of the transformer 3 will be substantially in phase with that applied to the operating circuits of the rectifier 15 through the tertiary winding 6 of this transformer. The voltage available for transmitting current through the saturation coils 12 and 14 may therefore be represented by the heavy portions of the curve $c$. The actual amount of current transmitted through the saturation coils 12 and 14, however, will also depend on the voltage applied to the control circuits of the rectifier. Thus, when the grid 19 has a negative potential, the voltage of the tertiary windings 6 will be incapable of initiating the supply of current to the saturation coil 14 and when the grid 20 has a negative potential, the supply of current to the saturation coil 12 will not be started.

Assuming no current to be transmitted through the load circuit 1, the voltage applied to the grid 19 through the transformer 36 will be little affected by its connection with the resistor 32 and reactor 33 and may be represented by the curve $b'$ of Fig. 4. The voltage applied to the grid 20 may be likewise represented by the curve $a$. Taking the first positive half of the wave $c$, it will be observed that the wave $b'$ becomes positive before the curve $a$. Current will therefore be supplied to the saturation coil 14 during a much longer period than to the coil 12 and the line 1 will be operated at a comparatively low voltage.

If it be assumed that a current I lagging behind the voltage C by an angle $\phi$ is transmitted through the load cicuit 1, a voltage drop shown as vector O-E will be produced across the resistor 32 and reactor 33. At the same time a voltage drop shown as the vector O-E' will be produced across the resistor 34 and reactor 35. The voltages now applied to grids 19 and 20 may be represented by the vectors O-G and O-F respectively. Since these vectors differ but slightly in phase, the supply of current to saturation coil 14 will be started only slightly in advance of the time at which the supply of current to the saturation coil 12 is initiated, and a higher voltage will be applied to the load circuit. As the current of the load circuit further increases in value, the grid voltages will be shifted in opposite directions until they are in phase with one another. When this occurs, the supply of current to the saturation coils 12 and 14 will begin at the same time, and a voltage corresponding to a point midway between the taps 7 and 8 will be impressed on the load circuit 1. Upon still further increases of the load circuit current, the load circuit voltage will be gradually increased until the core 11 is fully saturated and substantially the full secondary voltage of the transformer 3 is applied to the load circuit. The manner in which the arrangement functions to reduce the voltage of the load circuit as the current transmitted therethrough decreases in value will be readily understood from the previous explanation.

The embodiments of the invention illustrated and described herein have been selected for the purpose of clearly setting forth the principles involved. It will be apparent, however, that the invention, in its broader aspects, is susceptible of being modified in many ways to meet the different conditions encountered in its use.

What I claim as new and desire to secure by Letters Patent in the United States is:—

1. The combination of an alternating current circuit, and regulating means comprising a transformer provided with a plurality of taps, a plurality of reactors each arranged to interconnect said circuit with a different one of said taps, and means including an electron discharge device for varying the relation between the reactances of said reactors in accordance with an electrical condition of said circuit.

2. The combination of an alternating current circuit, and regulating means comprising a transformer provided with a plurality of taps, a plurality of reactors each arranged to interconnect said circuit with a different one of said taps, means for supplying currents to said reactors to vary their reactances, a device for rectifying the currents supplied to said reactors from said means, and control means associated with said device for varying the relation between the values of said currents in accordance with an electrical condition of said alternating current circuit.

3. The combination of an alternating current circuit, and regulating means comprising a transformer provided with a plurality of taps, a plurality of reactors each arranged to interconnect said circuit with a different one of said taps, means for supplying currents to said reactors to vary their reactances, a device for rectifying the currents supplied to said reactors from said means, control means associated with said device for varying the relation between the values of said currents, and means for energizing said control means in accordance with an electrical condition of said alternating current circuit.

4. The combination of an alternating current circuit, and regulating means comprising a transformer provided with a plurality of taps, a plurality of reactors each arranged to interconnect said circuit with a different one of said taps, means for supplying currents to said reactors to vary their reactances, a device for rectifying the currents supplied to said reactors from said means, control means associated with said device for varying the relation between the values of said currents, means for energizing said control means, and means for regulating the effect of said energizing means in accordance with an electrical condition of said system.

5. The combination of an alternating current load circuit and regulating means comprising a transformer having secondary and tertiary windings, a plurality of reactors arranged to connect spaced apart points of said secondary winding to said load circuit, means including an electron discharge device for interconnecting said tertiary winding with said reactors, and means connected to said device for varying the relation between the values of the currents supplied to said reactors from said tertiary winding in accordance with an electrical condition of said load circuit.

6. The combination of an alternating current load circuit and regulating means comprising a transformer having secondary and tertiary windings, a plurality of reactors arranged to connect spaced apart points of said secondary winding to said load circuit, means including an electron discharge device for interconnecting said tertiary winding with said reactors, a source of current for controlling the currents supplied from said tertiary winding to said reactors through said device, and means interposed between said load circuit and said source for regulating the effect of said source upon the relation between the values of said currents in accordance with an electrical condition of said load circuit.

7. The combination of an alternating current circuit, current supply means having a plurality of terminals for impressing different voltages on said circuit, a plurality of reactors each arranged to interconnect said circuit with a different one of said terminals, and means including an electron discharge device for varying the relation between the reactances of said reactors in accordance with an electrical condition of said circuit.

8. The combination of a plurality of electric circuits, transformation means connected between said circuits, means for controlling the effective ratio of said transformation means without change in the connections between said circuits and said transformation means, and means comprising an electron discharge device for regulating the operation of said control means in accordance with an electrical condition of one of said circuits.

9. The combination of a plurality of electric circuits, transformation means connected between said circuits, and means for controlling the effective ratio of said transformation means, said control means comprising an electron discharge device provided with a grid for controlling the transmission of current between its cathode and anode, and means for controlling the phase of the potential applied to said grid in accordance with an electrical condition of one of said circuits.

In witness whereof, I have hereunto set my hand this 16th day of January, 1925.

ERNST F. W. ALEXANDERSON.